United States Patent Office 3,623,897
Patented Nov. 30, 1971

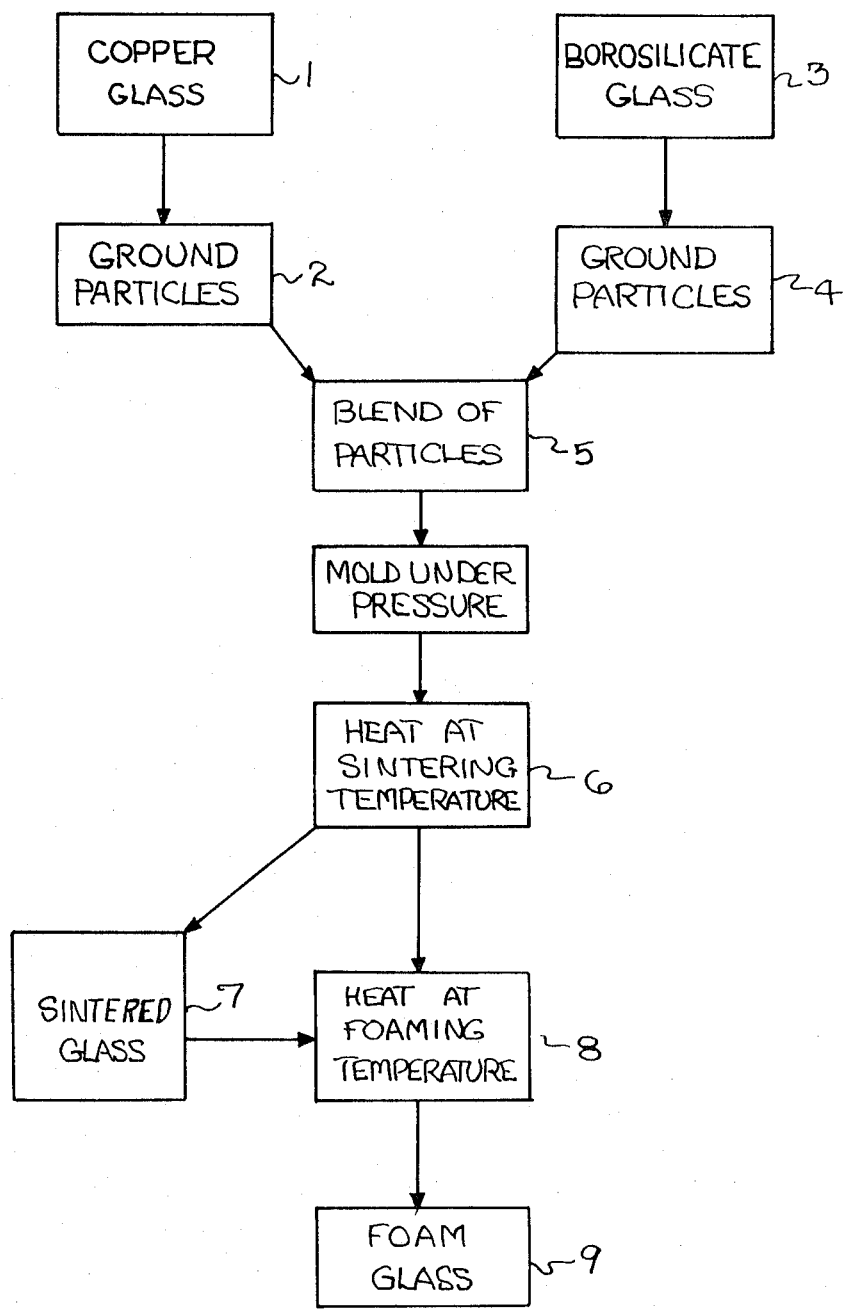

3,623,897
NOVEL FOAMABLE GLASS COMPOSITIONS COMPRISING COPPER
Gerald E. Wojcik, Toledo, Ohio, assignor to Owens-Illinois, Inc.
Filed June 16, 1969, Ser. No. 833,648
Int. Cl. C03c 3/04
U.S. Cl. 106—54      3 Claims

ABSTRACT OF THE DISCLOSURE

The invention pertains to novel sinter glass and foam glass made from an intimate blend of a copper glass and a brosilicate glass.

BACKGROUND OF THE INVENTION

The present invention relates to new glass compositions, to sinter glass and to foam glass. More particularly, the subject invention pertains to a novel composition of matter suitable for making sinter glass and foam glass. Specifically, the invention is concerned with a new glass composition consisting of a mixture of two glasses, a borosilicate glass and a copper glass, said glass composition being ideally suited for making either sinter glass or foam glass.

Foam or cellular glass has found wide usage as a building material because of its good thermal insulating properties against heat and cold. Foam glass is also employed by the building industry because it gives good insulation against sound. Foam glass may be used in various shapes, for example, blocks, panels and the like. Generally, conventional soda-lime type glasses are usually empolyed for making foam glass because of its processing properties and seemingly apparent low cost. The most common type of soda-lime glass used for the manufacture of foam glass is fairly hard soda-lime glass with a coefficient of expansion of about $65-80 \times 10^{-7}/°$ C. ($0-300°$ C.), such as common window glass. While other types of glasses have been used for fabricating foam glass, they have not found wide acceptance in the building industries, usually because the glasses lack the essential properties for making foam glass or the foam glass produced therefrom lacks the utilities as discussed herein.

It has now been unexpectedly found that the advantages of conventional foam glass can be retained and supplemented by other advantageous properties like non-communicating pores in the subject foam glass, which pores are water-tight and gas-tight and neither contracts nor expands when wet. The novel foam glass of this invention possessing improved properties can be made from a sinter glass. The basic composition of matter used to make the sinter glass consists essentially of two glasses, one a copper rich glass, the other a borosilicate glass.

Sinter glasses and sinter glass products, also known to the art as sintered glass, and when used herein sinter glass and sintered glass are deemed as equivalent terms, are made by converting glass powders into a compact solid body by heating it without converting the powder into a molten or fluid glass. The sintered glasses, as obtained from glass by the just-described sintering conditions, are porous in structure and they are conventionally used for making glass filters and for electrical insulation. In the present invention, the sinter glass is also used as a base glass for making foam glass, also are known as foamed glass.

In the light of the above diclosure, it is a purpose of the present invention to make available to the glass art a novel glass composition of matter suitable for making sinter glass and foam glass.

It is a further purpose of the subject invention to provide sinter glass and foam glass formed of relatively low thermal expansion glasses.

It is yet a further purpose of the present invention to provide a foam glass that is strong and possesses non-communicating pores impervious to the passage of moisture.

Yet still a further purpose of the invention is to provide a new glass composition acceptable for forming sintered glasses suitable for use in the stream of science and industry.

Other objects and advantages of the present invention will become readily apparent from the following detailed description taken in conjunction with the annexed sheet of drawing.

SUMMARY OF THE INVENTION

The invention concerns a new glass composition consisting essentially of a blend of a copper rich glass and a borosilicate glass. The copper glass and the borosilicate glass are intimately blended in the ratio of about 7 to 15 parts by weight of the copper glass to 85 to 93 parts by weight of the borosilicate glass. The composition produced from the unique blend can be used to form sinter glass and foam glass.

DESCRIPTION OF THE INVENTION

The two low expansion glasses blended together for the present purposes comprise a copper rich glass and a borosilicate glass. The copper glasses suitable for the purpose of this invention generally contain, expressed in mole percent, about 50 to 94% $SiO_2$, 0.5 to 30% $Al_2O_3$, 1.5 to 35% $Cu_2O$ and 0 to 6% $AlF_3$; a copper glass comprising 50 to 90% $SiO_2$, 5 to 30% $Al_2O_3$, 5 to 30% $Cu_2O$, about 0 to 6 %$NiO$, about 0 to 6% $Fe_2O_3$ and 0 to 6% $AlF_3$; a copper glass containing 75 to 80% $SiO_2$, about 8 to 13% $Al_2O_3$, about 8 to 13% $Cu_2O$, about 0 to 2.5% $NiO$, about 0 to 2.5% $Fe_2O_3$ and 0 to 2.5% $AlF_3$; a copper glass containing 77 to 78% $SiO_2$, 9 to 10% $Al_2O_3$, 12 to 13% $Cu_2O$ and 1 to 2% $AlF_3$; and a copper glass containing 77% $SiO_2$, 9.25% $Al_2O$, 12.45% $Cu_2O$ and 1.3% $AlF_3$. The copper glasses, as employed herein, generally have a coefficient of linear thermal expansion of not more than about $10 \times 10^{-7}/°$ C. ($0-300°$ C.), and usually from about $3 \times 10^{-7}/°$ C. to about $10 \times 10^{-7}/°$ C. ($0-300°$ C.). The copper rich glasses were prepared from Kona Quantas quartz, Alcoa A-14 alumina, $AlF_3$, and $Cu_2O$ to give the desired mole percent of $SiO_2$, $Al_2O_3$, $AlF_3$ and $Cu_2O$. The size of the melt was usually about 8 to 75 pounds, and the compositions were prepared by blending the batch ingredients and melting in platinum or silica crucibles at $1500°$ C. to $1600°$ C. for 15 to 16 hours in a glass furnace in a slight excess of oxygen. These copper rich glasses are also commercially available and they are described in U.S. Pat. No. 3,414,465 and No. 3,445,212.

The borosilicate glasses suitable for the purpose of the present invention are the low expansion borosilicate glasses that have a thermal coefficient of linear expansion not exceeding $45 \times 10^{-7}/°$ C. ($0-300°$ C.), and it is usually in the range of $30 \times 10^{-7}/°$ C. ($0-300°$ C.) to $45 \times 10^{-7}/°$ C. ($0-300°$ C.). The borosilicate glasses are well known to the prior art and they are disclosed, for example, in the book entitled "Technical Glasses" by M. P. Volf, pages 129 to 154, published by Sir Isaac Pitman and Sons, Ltd., London, and as set forth in expired U.S. Pat. No. 1,304,623. Exemplary of borosilicate glasses disclosed in the above reference are the borosilicate glasses of the acceptable compositional range comprising 70 to 90 weight percent $SiO_2$ (73 to 93 mole percent), 10 to 30 weight percent $B_2O_3$ (9 to 29 mole percent), 0 to 6 weight percent $Al_2O_3$ (0 to 5 mole percent), and 0 to 4 weight percent $Na_2O$ (0 to 4 mole percent). Exemplary of specific borosilicate glasses disclosed within the instant cited references and commercially available are a borosilicate glass consisting of 79 to 82 weight percent $SiO_2$ (81 to 83 mole percent), 11 to 14 mole percent $B_2O_3$ (11 to 13 mole percent), 1 to 3 weight percent $Al_2O_3$ (0.5 to 2 mole percent) and 3 to 5 weight percent $Na_2O$ (3 to 5 mole percent); the borosilicate glasses consisting essentially of 80.6 weight percent $SiO_2$ (82.6 mole percent), 13.0 weight percent $B_2O_3$ (12 mole percent), 2.2 weight percent $Al_2O_3$ (1.3 mole percent), 4.1 weight percent $Na_2O$ (4.4 mole percent) and 0.05 weight percent $Fe_2O_3$ (.01 mole percent); a borosilicate glass composition consisting of 80.9 weight percent $SiO_2$ (83.2 mole percent), 12.9 weight percent $B_2O_3$ (11.4 mole percent), 1.8 weight percent $Al_2O_3$ (1.2 mole percent) and 4.4 weight percent $Na_2O$ (4.4 mole percent); and a borosilicate glass consisting of 80.0 weight percent $SiO_2$ (93 mole percent), 2.17 weight percent $Al_2O_3$ (1.5 mole percent), 4.2 weight percent $Na_2O$ (4.8 mole percent), and 0.6 weight percent $K_2O$ (.4 mole percent).

The processes for forming sintered glass items of commerce are well known to the prior glass art. One customary process is to mix ground glass particles of any desired size with any acceptable binder, compact the resulting mixture and then fire the just compacted particles to a temperature sufficient to sinter the glass particles together and to burn-off the binder. Usually, organic binders such as nitrocellulose, gelatin and the like are mixed with the glass particles to form a paste-like composition which is fed into any conventional metal mold. Then, pressure is applied and the mold is brought up to a temperature above the transformation point of the glass to achieve the dual effects of burning the organic binder and fusing together the glass particles. The process described immediately above is disclosed in U.S. Pat. No. 3,414,394. Other art known sintering processes are set forth in now expired U.S. Pats. Nos. 2,494,582 and 2,618,104.

The processes for forming foam glass items of commerce and science are also well known to the prior art. The general basis of the production of foam glass is the liberation of gases or moisture in a glass mass softened by heat. This can be done by mixing with the glass powder a vehicle containing moisture that will evolve either vapors or gases on heating of the glass particles. This process is usually called a sintering process and it was described immediately above. In the foam glass process, the glass particles are first sintered into a cohesive glass sintered body at a sintering temperature and then at a subsequent slightly higher temperature, and the sintered body is converted into an integral porous product, that is, foam glass.

The above and following description and examples are merely representative of the spirit of the invention and they are not to be construed as limiting the invention as these and other methods will be obvious from the instant examples and disclosure to those skilled in the art.

EXAMPLE 1

A novel glass composition suitable for the purposes of this invention was prepared as follows: A quantity of commercially available copper glass consisting essentially of about 77 mole percent $SiO_2$, 9.25 mole percent $Al_2O_3$, 12.45 mole percent $Cu_2O$ and 1.30 mole percent $AlF_3$, with a coefficient of expansion of $5 \times 10^{-7}/°$ C. (0–300° C.) was ground to a particle size of about −100 mesh in a conventional laboratory ball mill apparatus. Next, a quantity of commercially available borosilicate glass consisting essentially of 80.6 weight percent $SiO_2$ (82.7 mole percent), 13.0 weight percent $B_2O_3$ (11.9 mole percent), 2.2 weight percent $Al_2O_3$ (1.3 mole percent), 4.1 weight percent $Na_2O$ (4.4 mole percent) and 0.05 weight percent $Fe_2O_3$ (.01 mole percent), having a thermal coefficient of expansion of $32 \times 10^{-7}/°$ C. (0–300° C.) was ground to a particle size of about 200 mesh in the ball mill grinding apparatus. Then, 10 grams of the ground copper glass were thoroughly blended with 90 grams of the ground borosilicate glass in a conventional laboratory V-blender until a homogeneous mixture of the two glasses was obtained, usually about 20 minutes of blending. The just-obtained mixture of ground glass particles consisting of the copper glass and the borosilicate glass was mixed with a few drops of nitrocellulose in amyl acetate and deposited into a stainless steel mold with a wall thickness of about ¼ inch. The mold mixture of ground glass was then pressed under a conventional laboratory press head to a pressure of 10,000 pounds per square inch (p.s.i.), and after the mold was removed from the press, the pressed glass mixture was then fired at 1560° F. (849° C.) for fifteen minutes in an electrically heated furnace. The product obtained as a resultant of the pressure and heating is a sintered glass article of manufacture, consisting of the copper and borosilicate glasses.

After the product has cooled to room temperature, the product was reheated to 1800° F. (982° C.) for ten minutes to give a foam glass. The foam glass exhibits a compression test strength of 1600 p.s.i., a buoyancy of greater than 50% and a water absorption after three hours submerged in water of less than 0.2%. The compression test was measured by loading the test specimen using an Instron Tensile Tester Model TT CM1. The sample was tested to its compression point under standard test conditions using a constant rate of speed and increasing force, with an increased force until the sample was unable to withstand the applied force. The buoyancy was determined by suspending the article from a string in water and measuring the portion of the article above the water and expressing the observed results in percent buoyancy. The water absorption was determined by change in weight for the foam glass product after it was submerged in water for three hours.

EXAMPLE 2

A piece of copper glass consisting essentially of 77.5 mole percent $SiO_2$, 10 mole percent $Al_2O_3$ and 12.5 mole percent $Cu_2O$ having a coefficient of linear thermal expansion of $5.1 \times 10^{-7}/°$ C. (0–300° C.), an annealing point of 1076° F. (580° C.), a softening point of 1616° F. (880° C.), and a working point of 2462° F. (1350° C.) was ground in a mill to a powdered glass having a substantially uniform particle size. Next, a piece of borosilicate glass consisting essentially of 80.9 weight percent $SiO_2$ (83.2 mole percent), 12.9 weight percent $B_2O_3$ (11.4 mole percent), 1.8 weight percent $Al_2O_3$ (1.1 mole percent) and 4.4 weight percent $Na_2O$ (4.4 mole percent) and having a coefficient of linear thermal expansion of about $32 \times 10^{-7}/°$ C. (0–300° C.), an annealing point of 1049° F. (565° C.), and a working point of 2264° F. (1240° C.), was ground to a powdered glass having a substantially uniform particle size equivalent to the just ground copper glass. After both glasses were ground, 10 grams of the copper glass particles and 90 grams of the borosilicate glass particles were mixed and then blended with a binder of commercially available polyethylene glycol compound with an average molecular weight of 15,000–20,000, a freezing point of 50 to 55, a viscosity of 210° F. of 57.3, an average liquid specific heat per cal./g. ° C. of 0.59, a heat of fusion per cal./g. of 41; a surface tension at 25° C. in dynes/cm. of 52; a solubility in water at 20° C. expressed in percent by weight of 60; and a flash point greater than 465° F. to form a slurry for loading into a mold. The filled mold was allowed to dry at room temperature and then pressed under a pressure head of 10,000 p.s.i. to compact the glass particles into the mold. The compaction pressure suitable for the present purposes is generally in the range of about 7500 p.s.i. to 12,500 p.s.i. Next, the compacted glass particles in the mold were subjected to sufficient heat to cause sufficient fusion and cohesion to give a sintered glass product. The sintering temperature was 1562° F. and this temperature was maintained for about 15 minutes, followed by cooling to ambient temperature. Generally, the sintering temperature for the glass blend is about 1500° F. to about 1600° F. (816° C. to 871° C.) and the sintering time is about 12 minutes to 18 minutes. Finally, the just cooled glass was heated to 1800° F. for 10 minutes to give a novel foam glass. The foaming temperature is usually about 1750° F. to about 1850° F. (954° C. to 1010° C.), and the foaming time is about 8 minutes to 12 minutes. The foam glass did not evidence any weight increase after being submerged in water as set forth in Example 1, apearing to indicate that the pores in the foam glass are noncommunicating pores.

EXAMPLE 3

In this example, the mixture prepared according to the procedure as set forth in Example 1 was used, except that no moisture or vehicle was added to the mixture of the copper glass and borosilicate glass particles. The particles were compacted at 10,000 p.s.i., and heated at 1550° F. for 15 minutes to give the sintered glass mold shape article. The material was next head to 1800° F. for 10 minutes, and this procedure resulted in a foam glass. The foam glass was water tight and it had a strength of about 1600 p.s.i. as measured by compression tests.

DESCRIPTION OF THE DRAWING

The process for preparing the sinter glass and the foam glass of this invention is illustrated in the accompanying flow drawing. In the drawing, a low expansion copper glass 1 is ground to uniform particle size 2 and blended 5 with medium expansion borosilicate glass 3 ground to uniform particle size 4. Next, the blended particles 5 are heat processed to the sintering temperature 6 to give a sinter glass 7 or, in the alternative, sinter glass 7 is heated to a glass foaming temperature 8 to give the inventive foam glass 9.

The sinter glass produced by this invention can be used for making porous sinter glass products like sintered glass filters having uniform and varying pore sizes. The sinter glass may also be used for electrical insulation of various kinds, and it can be used as the base glass for making foam glass. The foam glass, because of its apparent noncommunicating pores, can be used for either its thermal insulating properties or for its electrical insulating properties. The foam glass can also be employed as a building material with insulation against sound, and in the field of oceanography it may be employed for its buoyancy and anti-aqueous properties.

It can easily be seen that many modifications and variations of the present invention are possible in the light of the above teachings and broad disclosure. It is therefore to be understood that within the scope of the specification and claims, the invention may also be practiced otherwise than as specifically described herein.

I claim:

1. A glass composition of matter wherein said composition consists essentially of a homogeneous blend of a copper glass and a borosilicate glass, said copper glass consists essentially of 77 to 78 mole percent $SiO_2$, 9 to 10 mole percent $Al_2O_3$, 12 to 13 mole percent $Cu_2O$ and 1 to 2 mole percent $AlF_3$, said borosilicaate glass consists essentially of about 81 to about 83 mole percent $SiO_2$, 11 to 14 mole percent $B_2O_3$, 0.5 to 2 mole percent $Al_2O_3$ and 3 to 5 mole percent $Na_2O$, and wherein the blended glass consists of 7 to 15 parts by weight of the copper glass and 85 to 93 parts by weight of the borosilicate glass, wherein the copper glass has a linear thermal coefficient of expansion of $3 \times 10^{-7}/°$ C. (0–300° C.) to $10 \times 10^{-7}/°$ C. (0–300° C.) and wherein the borosilicate glass has a linear thermal coefficient of expansion of $30 \times 10^{-7}/°$ C. (0–300° C.) to $45 \times 10^{-7}/°$ C. (0–300° C.).

2. A sintered glass composition made from the composition defined in claim 1.

3. A foamed glass composition made from the composition defined in claim 1.

References Cited

UNITED STATES PATENTS

| | | | |
|---|---|---|---|
| 1,304,622 | 5/1919 | Sullivan et al. | 106—54 |
| 2,209,170 | 7/1940 | Nevin et al. | 106—40 |
| 2,306,310 | 12/1942 | Haux | 106—40 X |
| 3,414,465 | 12/1968 | Baak et al. | 106—52 X |
| 3,420,645 | 1/1969 | Hair | 106—52 X |
| 3,445,212 | 5/1969 | Bishop | 106—52 X |

OTHER REFERENCES

Morey, G. D.: Properties of Glass, New York, 1954, p. 285.

Hoogendoorn, H.: Infrared Absorbing Sealing Glasses, in Bath Amer. Soc. 48 (1969), pp. 1125–1127.

JAMES E. PIER, Primary Examiner

W. R. SATTERFIELD, Assistant Examiner

U.S. Cl. X.R.

65—22; 106—40, 52; 264—43